(12) United States Patent
Takata et al.

(10) Patent No.: US 6,422,332 B1
(45) Date of Patent: Jul. 23, 2002

(54) INTAKE APPARATUS OF ENGINE FOR VEHICLE

(75) Inventors: Hiroshi Takata, Kobe; Hisayoshi Shibata, Akashi; Shoji Idei, Kakogawa, all of (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/492,312

(22) Filed: Jan. 27, 2000

(30) Foreign Application Priority Data

Sep. 21, 1999 (JP) ............................................. 11-266745

(51) Int. Cl.[7] ............................. B60K 13/02; F01P 9/00
(52) U.S. Cl. ...................... 180/68.3; 180/219; 180/225; 180/229; 180/41.56; 123/41.01
(58) Field of Search .................................. 180/229, 219, 180/68.3, 68.1, 225, 41.56; 123/41.01

(56) References Cited

U.S. PATENT DOCUMENTS

| 4,678,223 | A | * | 7/1987 | Kishi et al. ................. | 180/219 |
|---|---|---|---|---|---|
| 4,793,293 | A | | 12/1988 | Minami | |
| 4,911,494 | A | * | 3/1990 | Imai et al. ................... | 180/229 |
| 4,982,973 | A | * | 1/1991 | Saito et al. ................. | 180/229 |
| 5,012,883 | A | * | 5/1991 | Hiramatsu .................. | 180/219 |
| 5,301,767 | A | * | 4/1994 | Shiohara .................... | 180/68.3 |
| 5,323,869 | A | * | 6/1994 | Kurayoshi et al. .......... | 180/219 |
| 5,490,573 | A | * | 2/1996 | Hagiwara et al. .......... | 180/68.1 |
| 5,577,570 | A | * | 11/1996 | Shiohara et al. ........... | 180/68.1 |
| 5,657,628 | A | * | 8/1997 | Takeuchi .................... | 180/219 |
| 5,732,686 | A | * | 3/1998 | Yokoyama et al. ........ | 123/41.01 |
| 6,019,161 | A | * | 2/2000 | Travis ........................ | 180/229 |

FOREIGN PATENT DOCUMENTS

| DE | 3831792 | * | 3/1990 | ................ 180/68.1 |
|---|---|---|---|---|
| GB | 2127363 | * | 4/1984 | ................ 180/68.1 |
| JP | 60-215424 | | 10/1985 | |
| JP | 1-175585 | * | 1/1989 | ................ 180/219 |
| JP | 2-234889 | * | 2/1990 | ................ 180/219 |
| JP | 0128975 | * | 5/1990 | ................ 180/68.1 |
| JP | 0135888 | * | 6/1991 | ................ 180/68.1 |
| JP | 403243486 | * | 10/1991 | ................ 180/68.1 |
| JP | A-4-43185 | | 2/1992 | |
| JP | U-4-95584 | | 8/1992 | |
| JP | A-8-53088 | | 2/1996 | |
| JP | B2-2704369 | | 10/1997 | |
| JP | 10-196478 | | 7/1998 | |
| JP | 10-331733 | | 12/1998 | |
| JP | 11-079032 | | 3/1999 | |
| JP | 11-192989 | | 7/1999 | |
| JP | A-11-192989 | | 7/1999 | |

* cited by examiner

Primary Examiner—Lanna Mai
Assistant Examiner—Toan To
(74) Attorney, Agent, or Firm—Oliff & Berridge, PLC (57) ABSTRACT

An intake apparatus is provided for an engine of a vehicle. The intake apparatus can introduce fresh air under the vehicle's large running wind pressure. The intake apparatus also allows the opening area and profile of an air inlet to be selected freely. The intake apparatus includes a pair of intake ducts 13 for introducing the air into the engine and an air-introducing duct 15 connected to respective upstream ends of the intake ducts 13 to provide the air inlet 14. The air-introducing duct 15 is formed independently of a cowling 16 fitted to a front of the vehicle. The air-introducing duct 15 has its leading end 15a positioned ahead of a leading end 16a of the cowling 16.

9 Claims, 7 Drawing Sheets

INTAKE APPARATUS OF ENGINE FOR VEHICLE

BACKGROUND OF THE INVENTION

1. Technical Field of the Invention

The present invention relates to an intake apparatus of an engine mounted on a motorcycle or the like.

2. Description of the Related Art

Figure 9:
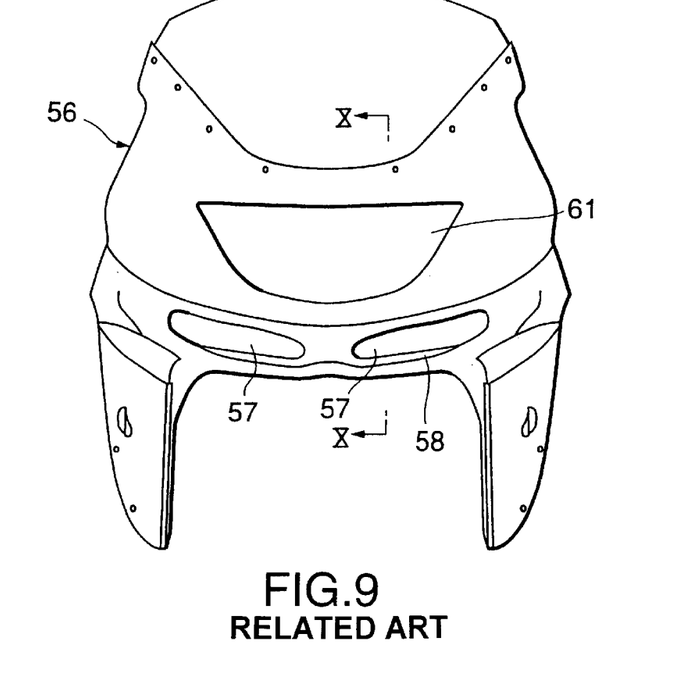
FIG. 9 is a front view of the conventional cowling.
Figure 10:
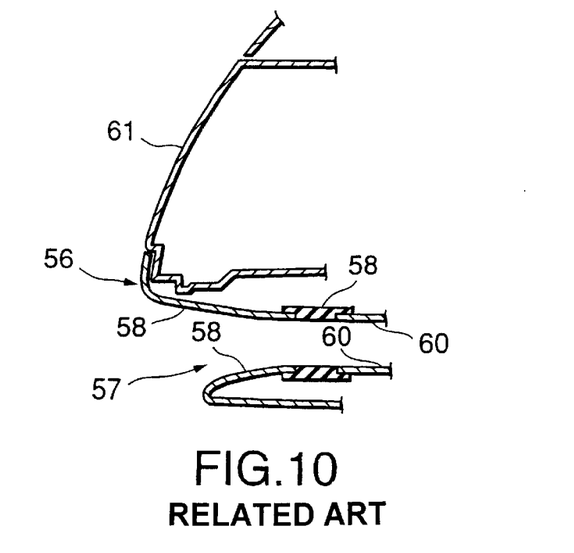
FIG. 10 is sectional view taken along a line X—X of FIG. 9.

In the conventional motorcycle, a cowling 56 as shown in FIG. 9 is attached to a front side of a motorcycle body. The cowling 56 is provided, on a front side thereof, with an air-introducing duct 58 having air inlets 57 allowing air in a motorcycle engine (Japanese Patent Publication No. 2704369). At the rear end of the air-introducing, duct 58, an intake duct 60 is connected to the duct 58 through the intermediary of a rubber seal 59, as shown in FIG. 10. In FIG. 9, the air inlets 57 are arranged on both sides of the underside of a head lamp unit 61. In the modification, they may be arranged on both sides of the head lamp unit 61 or both sides of the upside of the unit 61.

In the above-mentioned constitution, however, since the air-introducing duct 58 is formed integrally with the cowling 56, the air inlet 57 is influenced in terms of its opening area and profile by the profile and dimension of the cowling 56. Therefore, there is a case that the degree of freedom in design of the port 57 is not only reduced but also causing the difficulty of taking air in a position where the running wind pressure is sufficiently great. Alternatively, when the opening area and profile of the air inlet 57 have to be altered for increasing engine output etc., the above-mentioned constitution needs to change the entire cowling 56 to another one.

SUMMARY OF THE INVENTION

Under such a situation, it is therefore an object of the present invention to provide an intake apparatus for a vehicle engine, which is capable of taking the air under a higher running wind pressure and which allows to select the opening area and profile of the air inlet.

According to the present invention, as the first feature, there is provided an intake apparatus of an engine for a vehicle having a cowling fitted to a front of a vehicle body, the intake apparatus comprising:

an intake duct for introducing air into the engine; and an air-introducing duct connected to the upstream end of the intake duct to form an air inlet of the engine;

wherein the air-introducing duct is constituted independently of the cowling and arranged so that a leading end of the air-introducing duct occupies ahead of a leading end of the cowling.

In the so-constructed intake apparatus, the leading end of the air-introducing duct is arranged ahead of the leading end of the cowling. Therefore, there can be obtained a high running wind pressure at the leading end of the air-introducing duct, in comparison with the running wind pressure at the leading end of the cowling. Consequently, it is possible to improve an output of the engine. Further, since the air-introducing duct is constituted independently of the cowling, it is possible to further improve the engine output upon the option of the air inlet in terms of its opening area, profile, etc.

Further to the intake apparatus of the first feature, the second feature of the invention resides in that the air-introducing duct is adapted so that an air passage formed therein extends along its longitudinal axis making a designated angle to a horizontal plane, i.e. a level. The designated angle is established so as to realize the vehicle's optimum condition at a vehicle's design speed. Note, the vehicle's design speed designates a predetermined speed allowing of enhancing a variety of vehicle's characteristics, for example, its controllability, engine output, fuel consumption, etc. The vehicle's optimum condition nominates a condition under which the running wind pressure of fresh air introduced through the air inlet can be maximized at the vehicle's design speed.

In this way, since the running wind pressure can be maximized at the vehicle's design speed, it is possible to improve the engine output.

Further to the intake apparatus of the first feature, the third feature of the invention resides in that the air-introducing duct is formed so that the leading end has a bell-mouth configuration. It is noted that the bell-mouth configuration designates a profile that the air passage is gently enlarged toward its upstream end in order to reduce a pressure loss of the fresh air.

According to the third feature of the invention, since the air being introduced through the so-constructed air inlet has a reduced pressure loss owing to the bell-mouth configuration, it is possible to improve the engine output as much.

Further to the intake apparatus of the second feature, the fourth feature of the invention resides in that the designated angle is substantially 0 degree under condition that the vehicle travels at a vehicle's design speed.

According to the fourth feature of the invention, when the vehicle is travelling at a vehicle's design speed, the air passage formed in the air-introducing duct extends substantially parallel to the horizontal plane, i.e. the level. In this way, the maximum running wind pressure can be obtained.

Further to the intake apparatus of the fourth feature, the fifth feature of the invention resides in that the designated angle ranges from about 3 to about 6 degrees while the vehicle with no rider stops.

According to the fifth feature of the invention, owing to the above establishment of the angle of the air, it is possible to attain the angle of the air passage of substantial zero (0) degree under condition that the loaded vehicle travels at the vehicle's design speed. In this way, the maximum running wind pressure can be obtained the angle of substantial.

According to the present invention, as the sixth feature, there is also provided an intake apparatus of an engine for a vehicle having a cowling fitted to a front of a vehicle body, the intake apparatus comprising:

an intake duct for introducing air into the engine; and an air-introducing duct connected to the upstream end of the intake duct to form an air inlet of the engine;

wherein the air-introducing duct is constituted independently of the cowling and also fastened to the cowling by at least one fastening member inserted from the interior of the cowling.

In the intake apparatus in accordance with the sixth feature, the air-introducing duct is fastened from the interior side of the cowling. Thus, it is possible to reduce irregularities appearing on the inner face of the air-introducing duct, whereby the pressure loss of the intake air can be decreased thereby to obtain the running wind pressure as much. Additionally, since there is a great space defined in the cowling, the attaching or detaching operation of the air-introducing duct against the cowling can be performed with ease. Therefore, even when altering the air-introducing duct to another one, there is no need to change the cowling but the air-introducing duct. It is possible to select an opening area of the air inlet, the profile, etc. easily.

Further to the intake apparatus of the sixth feature, the seventh feature of the invention resides in that the air-introducing duct is arranged so that a leading end of the air-introducing duct occupies ahead of the leading end of the cowling.

Also in this case, the running wind pressure at the leading end of the air-introducing duct becomes larger than the running wind pressure at the leading end of the cowling. Consequently, it is possible to improve the engine output.

Further to the intake apparatus of the seventh feature, the eighth feature of the invention resides in that the air-introducing duct is provided, at a downstream side thereof, with an enlarged socket part into which the intake duct is inserted.

Owing to the provision of the enlarged socket part, it is possible to reduce a step produced an inner wall of the inserted intake duct and the inner face of the air-introducing duct, whereby the pressure loss of the fresh air flowing in the air-introducing duct can be reduced.

Further to the intake apparatus of the eighth feature, the ninth feature of the invention resides in that the intake apparatus further comprises a screen in the form of a mesh. The mesh type of screen is disposed in the air-introducing duct and also interposed between an upstream end of the enlarged socket part and the intake duct.

In this case, there is no need to prepare any means of positioning the screen in the air-introducing duct.

The above and other features and advantages of this invention will become apparent, and the invention itself will best be understood, from a study of the following description and appended claims, with reference had to the attached drawings showing a preferred embodiment of the invention.

DESCRIPTION OF THE PREFERRED EMBODIMENT

With reference to drawings, a preferable embodiment of the present invention will be described below.

Figure 1:
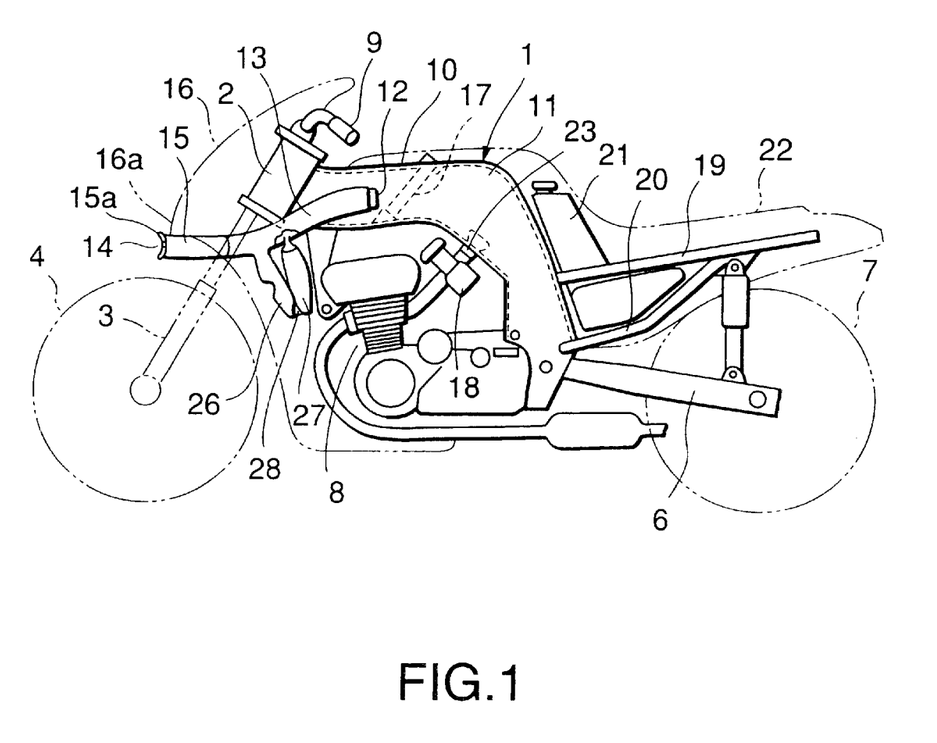
FIG. 1 is a side view of a motorcycle equipped with an intake apparatus in accordance with an embodiment of the present invention.

FIG. 1 is a side view of a motorcycle equipped with an intake apparatus in accordance with an embodiment of the present invention.

In the shown motorcycle, a front wheel 4 is attached to a front fork 3. The front fork 3 is carried by a head pipe 2 arranged on the front side of a body frame 1. While, a rear wheel 7 is attached to a swing arm 6 pivotally carried by a central lower part of the body frame 1. The rear wheel 7 is driven by an engine 8 mounted on a center part of the body frame 1, while the motorcycle is adapted so as to be steered by a handle 9 fixed on a top of the front fork 3.

The front part of the body frame 1 is constituted by a single main frame 10 in monocoque structure. The main frame 10 has its front end connected to the head pipe 2. In the main frame 10, an air cleaner section 11 is provided to clean intake air introduced into the engine 8. Respectively connected to left and right inlets 12 in pairs, which are formed on the front part of the air cleaner part 11, are resinous intake ducts 13 which take the intake air into the engine 8. Each intake duct 13 is provided, on a halfway thereof, with a surge tank 26 molded integrally with the duct 13. On the downstream side of the surge tank 26, an intake resonator 27 is connected to provide an intake expansion chamber.

In order to remove raindrops and water from the intake air, the surge tank 26 serves to temporarily decrease the velocity of fresh air being introduced at high speed by the action of running wind pressure, for example, less than 5 m/s. In this way, the raindrops and water can be prevented from entering into an air cleaner 20. The resonator 27 operates to reduce the sound pressure level of intake air noise at specific frequency since the interior intake expansion chamber resonates with the vibrations of flowing air (pneumatic vibrations) in the intake duct 13. The intake resonator 27 and the intake duct 13 are not provided into one body. The upper introductory part of the resonator 27 is connected to the intake duct 13 through a soft grommet (not shown), while the lower part of the resonator 27 is carried by the lower part of the surge tank 26 through a fixture 28.

The upstream ends of both intake ducts 13 are connected with an air introducing duct 15 forming an air inlet 14. The air-introducing duct 15 is arranged in a manner that its leading end 15a is in front of a leading end 16a of a cowling 16 on the front side of the motorcycle body. The air introducing duct 15 and the cowling 16 are respectively molded of resin. A cleaner element 17 is disposed in the air cleaner section 11.

The rear half section of the body frame 1 consists of left and right seat rails 19 and accompanying reinforcements 20 extending rearward from the rear part of the main frame 10. A fuel tank 21 and a driver's seat 22 are mounted on the seat rails 19. Connected on the under face of a rear part of the main frame 10 is a down-draft type of duct 23 which connects the air cleaner section 11 with a carburetor 10 of the engine 8.

Figure 2A:
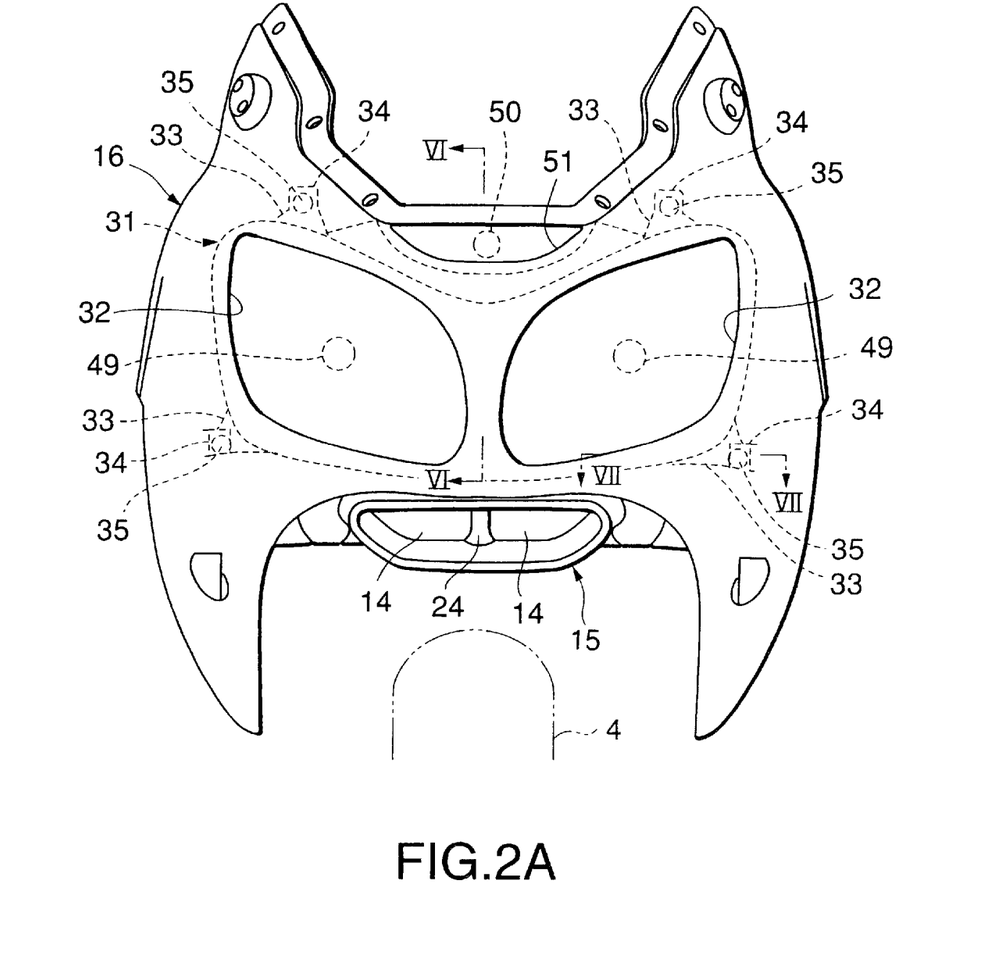
FIG. 2A is a front view of a cowling of the motorcycle and FIG. 2B is a front view showing another profile of air inlets.

As shown in FIG. 2A, the cowling 16 is provided with its lower part which is forked so as not to interfere with the front wheel 4, and the intermediate part which includes with a pair of left and right openings 32 allowing a lamp unit 31 to direct forward. The air-introducing duct 15 is arranged below the center of the cowling 16 in the left and right directions so that the leading end 15a is in front of the leading end 16a of the cowling 16, providing a flat configuration in the left and right directions.

Figure 7:
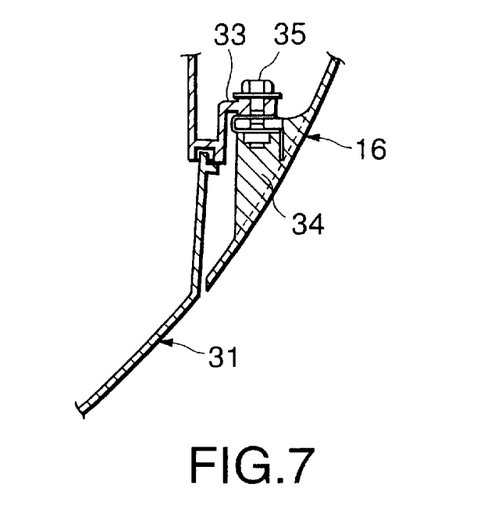
FIG. 7 is a sectional view taken along a line VII—VII of FIG. 2, showing an attachment structure for the lamp unit to the cowling.

The lamp unit 31 is carried by the cowling 16 since attachment parts 33 on the periphery of the unit 31 are fixed to a plurality of mounts 34 formed on the back of the cowling 16 by means of bolts 35. FIG. 7 is a horizontally sectional view showing the resultant fixture using the bolts 35 partially.

Figure 3:
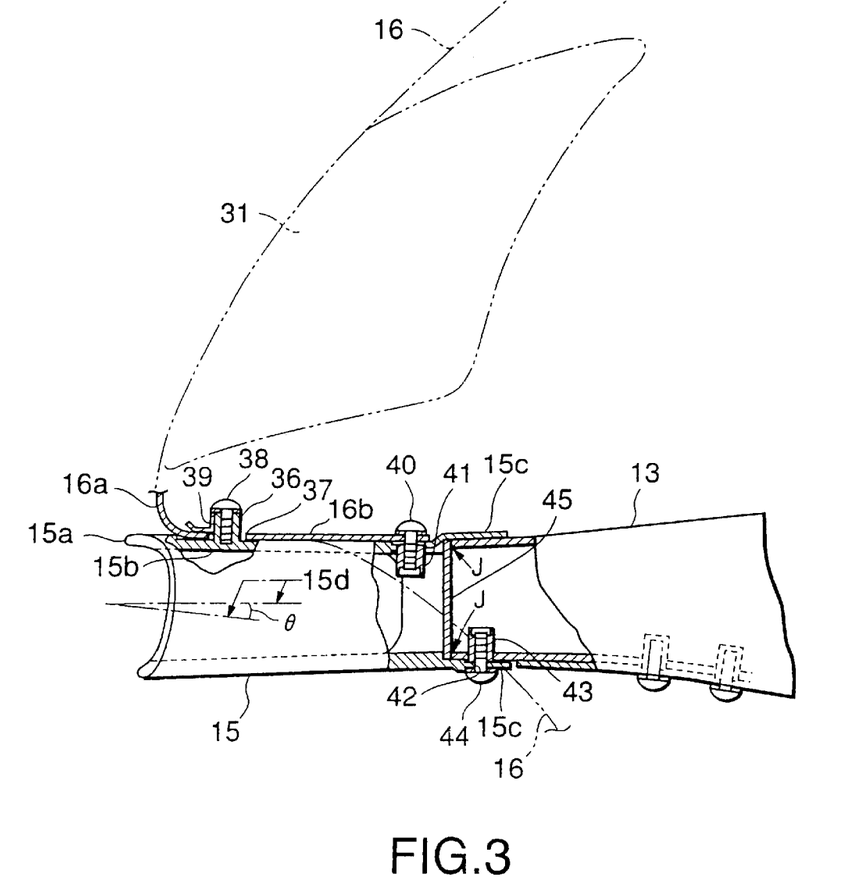
FIG. 3 is a side view of an attachment structure for an air-introducing duct to the cowling, showing a partial section of the attachment structure.
Figure 4:
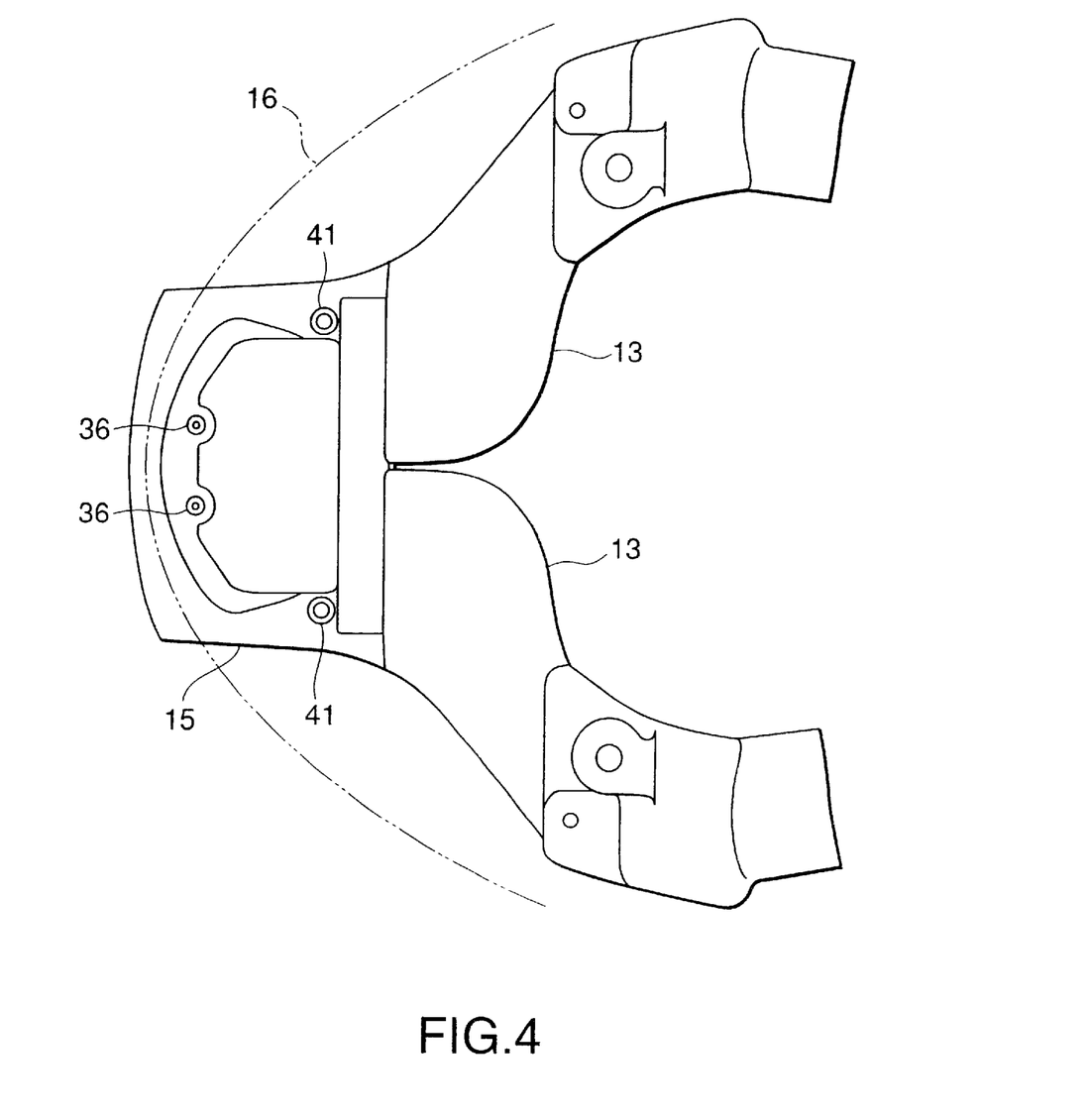
FIG. 4 is a plan view showing a connection between the air-introducing duct and an intake duct.
Figure 5:
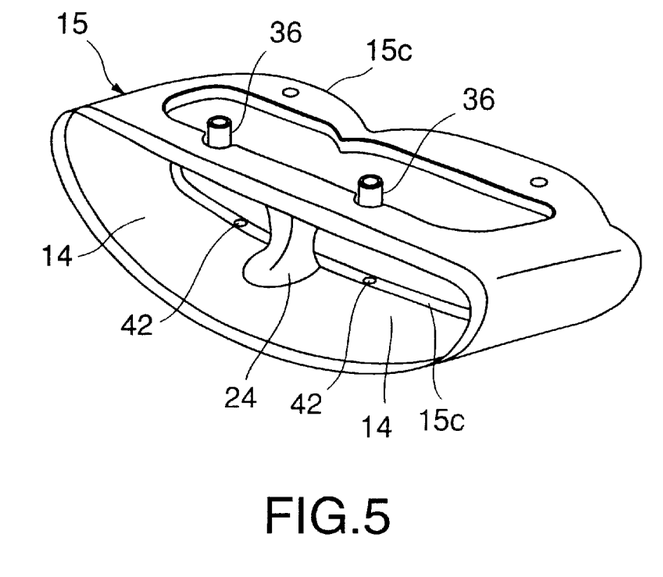
FIG. 5 is a perspective view of the air-introducing duct.

FIG. 3 is a side view including a partial section, showing a state that the air-introducing duct 15 connected the upstream end of the intake duct 13 is fastened to the lower part of the cowling 16. FIG. 4 is a plan view showing a connection between the air-introducing duct 15 and the intake duct 13. FIG. 5 is a perspective view of the air-introducing duct 15. As shown in FIG. 5, the interior of the air-introducing duct 15 is divided into two passages through a partition wall 24. The air-introducing duct 15 is provided, on a front top thereof, with a pair of left and right bosses 36. As shown in FIG. 3, both of the left and right bosses 36 are inserted into left and right insertion holes 37 formed in a central lower part 16b of the cowling 16. Then, an iron-nail piece 39 is pinched between the bosses 36 and self tapping screws 38 as fastening members, which are threaded into the bosses 36 from the interior side of the cowling 16. Further, the lower part 16b of the cowling 16 is pinched between the nail piece 39 and the upper face of the air-introducing duct 15, so that the front part of the air-introducing duct 15 is fitted to the lower part 16b of the cowling 16. Thus, owing to the above fastening mechanism about the self-tapping screws 38, it is possible to eliminate irregularities on an inner face 15b of the air-introducing duct 15. The upper face on the rear side of the air-introducing duct 15 is attached to the lower part 16b of the cowling 16 by screwing screws 40 (fastening members) into nuts 41 through through-holes in the cowling 16, from the interior side of the cowling 16. Noted, the nuts 41 are fixed to a part of the duct 15 overlapping with the lower part 16b of the cowling 16.

In the air-introducing duct 15, the air passage's downward angle θ under a rider-less and stop condition to a horizontal plane (see FIG. 3) is set to a designated value by which the running wind pressure introduced through the air inlets 14 can be maximized at the vehicle's design speed. When the rider rides on the motorcycle at the vehicle's design speed, the air passage's downward angle is changed to substantially 0 degrees, that is, the level. In order to obtain the above vehicle's condition, the air passage is adapted so as to extend along its longitudinal axis 15d making the air passage's downward angle θ in a range of about 3 to about 6 degrees (4.5 degree in this case). In the conventional case, the air passage's downward angle θ has been set in the range from 0.5 to 1.0 degrees.

As shown in FIG. 3, the air-introducing duct 15 is provided, on a downstream side thereof, with an enlarged socket part 15c. In connection with the left and right intake ducts 13, as shown in FIG. 3, they are inserted into the socket part 15c. In detail, the upstream ends of the intake ducts 13 are inserted into the socket part 15c and fixed with the rear portion (i.e. the socket part 15c) of the air-introducing duct 15 by screws 44. The screws 44 are screwed into nuts 43 through through-holes 42 from the exterior side of the air-introducing duct 15. The nuts 43 are secured on the intake ducts 13. The through-holes 42 are formed in the socket part 15c. By interposing a mesh-type screen 45 between a shoulder part (upstream end) of the socket part 15c and the respective upstream ends of the ducts 13, the screen 45 is disposed in the air-introducing duct 15 in stable. Owing to the provision of the enlarged socket part 15c, it is possible to reduce a step produced between respective inner walls of the inserted intake ducts 13 and the inner face of the air-introducing duct 15. Accordingly, the pressure loss of the fresh air flowing in the air-introducing duct 15 can be reduced.

Figure 6:
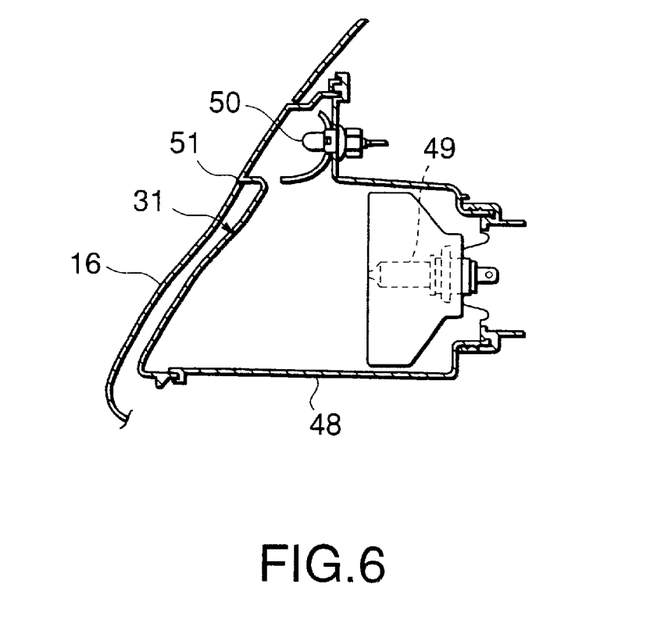
FIG. 6 is a sectional view taken along a line VI—VI of FIG. 2, showing a lamp unit.

FIG. 6 is a cross-sectional view taken along a line VI—VI of FIG. 2A. As shown in FIG. 6, the lamp unit 31 comprises an unit housing 48, a pair of left and right head lamps 49 and a central upper positioning lamp 50 all arranged in the unit housing 48. As shown in FIG. 2A, the positioning lamp 50 is adapted so as to face onto a small opening 51 at the center of the upside of the openings 32 of the cowling 16.

Figure 2B:
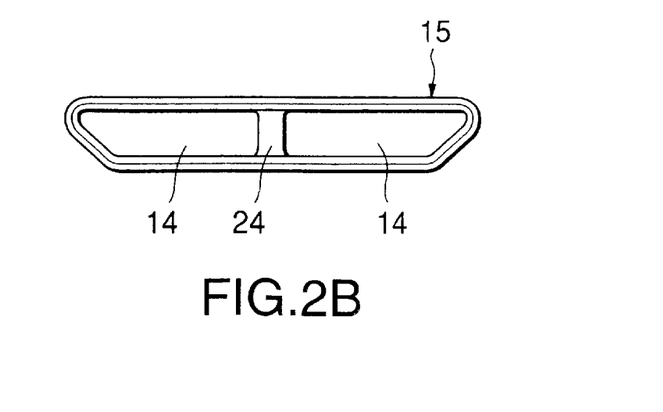

In this embodiment, the leading end of the air-introducing duct 15 forming the air inlets 14 is positioned ahead of the leading end 16a of the cowling 16. It is possible to introduce the running wind of wind pressure (dynamic pressure) which has not been reduced due to the collision with the cowling 16 yet. Therefore, the air-introducing duct 15 can be subjected to a high running wind pressure in comparison with the conventional duct. Therefore, the engine output is improved in comparison with that of the conventional case. It is found that the ram pressure (running wind pressure) at the vehicle's running speed of 100 km/h can be increased by approx. 55% in comparison with the ram pressure under the same condition in the conventional intake apparatus. Similarly, at the vehicle's running speed of 200 km/h, the ram pressure can be increased by approx. 33%. In this way, it is possible to improve the engine output. Since the air-introducing duct 15 is constituted independently of the cowling 16, it is possible to ensure an appropriate value as the opening area of the air inlet 14 without suffering restrictions due to the configuration and dimension of the cowling 16. Also in this view, the engine output is improved. In other words, the air inlet 14 of FIG. 2A can be easily modified to another one having a wider opening area, for example, the air inlet 14 shown in FIG. 2B.

Figure 8:
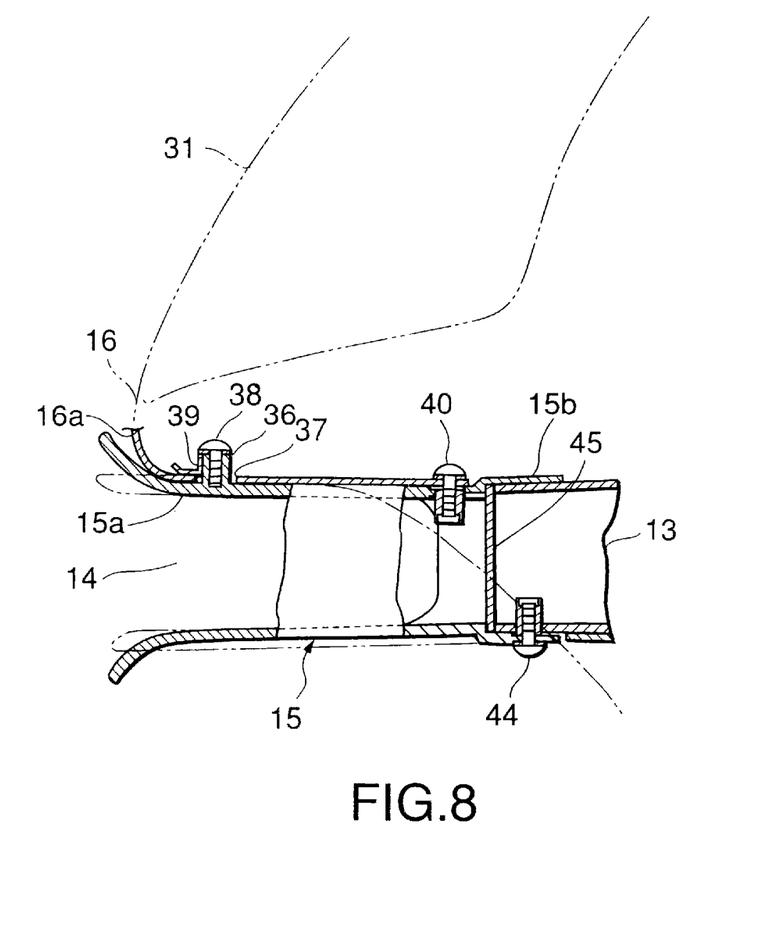
FIG. 8 is a side view of an attachment structure for another air-introducing duct to the cowling, showing a partial section of the attachment structure.

Similarly, since the air-introducing duct 15 is constituted independently of the cowling 16, the profile of the air inlet 14 can be selected optionally without being restricted by the molding of the cowling 16. For example, as shown in FIG. 8, the leading end of the air-introducing duct 15 of FIG. 3 may be modified into the form of a bell mouth where the air passage is gradually expanded in a bell-shaped manner toward the upstream side. In this case, then it is possible to reduce the pressure loss of intake air introduced through the air inlet 14. Note, FIG. 8 clearly shows a difference in shape of the duct 15 between the previously mentioned embodiment and the modification while illustrating the profile of the leading end of the duct 15 of FIG. 3 with an alternate long and short line.

Furthermore, owing to the provision of the so-compact air-introducing duct 15 constructed independently of the cowling 16, it is possible to reduce the draft angle of the inner faces of the air inlet 14 during the molding. The required opening area of the air passage can be ensured with ease. While, in the conventional case of molding the air inlets integrally with the cowling, there are many restrictions in molding, such as a requirement of a great draft angle, because the molding article becomes to be large-sized. Consequently, the effective opening area of the air inlet becomes smaller thereby to make it difficult to ensure a required opening area, causing the pressure loss of intake air to be increased.

According to the embodiment, by the above-mentioned reason, it is possible to determine both arrangement and configuration of the air inlet 14 under the less influence of the arrangement of the lamp unit 31. Thus, the cowling 16 can be provided with its innovative front shape thereby to improve the appearance of the vehicle.

Repeatedly, the air-introducing duct 15 is fastened to the cowling 16 by means of the fastening members, that is, the self tapping screws 38 and the screws 40 all inserted from the interior of the cowling 16, as shown in FIGS. 3 and 8. Therefore, as represented by the front fastening portion of the bosses 38 and the self tapping screws 38, it is possible to restrain such fastening portions from producing the irregularities on the inner face 15b of the air-introducing duct 15, as possible. Consequently, it is possible to reduce the pressure loss of air 20 flowing through the air-introducing duct 15. The shown rear fastening portion consisting of the rear screws 40 and the bosses 41 actually projects from the inner face 15b of the air-introducing duct 15 in view of the restriction in the surrounding space. Of course, this rear fastening portion may be constructed so as not to project inward, as similar to the above-mentioned front fastening portion.

Furthermore, owing to the structure where the fastening members 38, 40 are fastened from the inside of the cowling 16 having a large interior space, it allows to facilitate the attachment and detachment operation of the air-introducing duct 15 with respect to the cowling 16. As the result, if desired to change the air-introducing duct 15, it is possible to easily cope with the arrangement without altering the cowling 16 but the air-introducing duct 15 only. Additionally, since a joint part J between the air-introducing duct 15 and the intake ducts 13 is shaped to be a less-stepped passage, which is similar to the conventional case, it is possible to reduce the pressure loss of the intake air to the utmost.

Although the above-mentioned embodiment is directed to the motorcycle, of course, the present invention is also applicable to intake apparatuses of other vehicles.

In conclusion, according to the invention, the leading end of the air-introducing duct is positioned in front of the leading end of the cowling. It is possible to obtain a high running wind pressure at the leading end of the air-introducing duct in comparison with the running wind pressure at the leading end of the cowling, improving the engine output. Owing to the provision of the air-introducing duct independent of the cowling, it is possible to further improve the engine output upon the free selection of the air inlet in terms of its opening area, profile, etc.

Furthermore, owing to the fastening of the air-introducing duct from the interior side of the cowling, it is possible to reduce irregularities appearing on the inner face of the air-introducing duct. Therefore, the pressure loss of the intake air can be decreased thereby to obtain the running wind pressure as much. Additionally, since there is a great space defined in the cowling, the attaching or detaching operation of the air-introducing duct against the cowling can be performed with ease. Therefore, even when altering the air-introducing duct to another one, there is no need to change the cowling but the air-introducing duct. It is possible to facilitate the selection of the air inlet in terms of its opening area, the profile, etc.

What is claimed is:

1. An intake apparatus of an engine for a vehicle, the intake apparatus comprising:

a cowling fitted to a front of a vehicle body;

an intake duct connected with the engine for introducing air into the engine; and an air-introducing duct opening into an outside atmosphere and being connected to the upstream end of the intake duct to form an air inlet of the engine, wherein the air-introducing duct is constituted independently of the cowling and located below the bottom edge of the cowling at a central area between a left and a right side of the cowling, a leading end of the air-introducing duct being positioned ahead of a leading end of the cowling so that pressure at an inlet of the air-introducing duct is prevented from decreasing by an influence of an air flow along the cowling.

2. An intake apparatus as claimed in claim 1, wherein the air-introducing duct is formed so that an air passage formed therethrough extends along a longitudinal axis of the air-introducing duct making a designated angle to a horizontal plane.

3. An intake apparatus as claimed in claim 1, wherein the air-introducing duct is formed so that the leading end has a bell-mouth configuration in which a diameter of the leading end is bigger than a diameter of a main portion of the air-introducing duct.

4. An intake apparatus as claimed in claim 2, wherein the designated angle is substantially 0 degree under condition that the vehicle with a rider travels at a vehicle's design speed.

5. An intake apparatus as claimed in claim 3, wherein the leading end having the bell-mouth configuration is formed so as to cover the leading end of the cowling.

6. An intake apparatus of an engine for a vehicle, the intake apparatus comprising:

a cowling fitted to a front of a vehicle body;

an intake duct connected with the engine for introducing air into the engine; and an air-introducing duct opening into an outside atmosphere and being connected to the upstream end of the intake duct to form an air inlet of the engine, wherein the air-introducing duct is constituted independently of the cowling located under the cowling at a central area between a left and a right side of the cowling, the air-introducing duct being fastened to the cowling by at least one fastening member inserted from the interior of the cowling, wherein the air introducing duct is arranged so that a leading end of the air introducing duct is positioned ahead of the leading end of the cowling.

7. An intake apparatus as claimed in claim 6, wherein the air-introducing duct is provided, at a downstream side thereof, with an enlarged socket part into which the intake duct is inserted.

8. An intake apparatus as claimed in claim 7, further comprising a screen in the form of a mesh, which is disposed in the air-introducing duct and also interposed between an upstream end of the enlarged socket part and the intake duct.

9. An intake apparatus as claimed in claim 6, wherein an under part of the cowling has hole, the air-introducing duct being provided with a boss projecting upwardly from the upper surface of the air-introducing duct, having a fastening thread and being inserted in the hole, the fastening member inserted from the interior of the cowling fastening the air-introducing duct to the cowling.

* * * * *